(12) United States Patent
Choi et al.

(10) Patent No.: US 8,817,038 B2
(45) Date of Patent: Aug. 26, 2014

(54) DISPLAY APPARATUS AND METHOD FOR DRIVING THE SAME

(75) Inventors: Yong-Seok Choi, Yongin (KR); Byung-Ki Chun, Yongin (KR); Jong-Woong Park, Yongin (KR); Joo-Hyung Lee, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 288 days.

(21) Appl. No.: 13/313,914

(22) Filed: Dec. 7, 2011

(65) Prior Publication Data

US 2013/0033517 A1    Feb. 7, 2013

(30) Foreign Application Priority Data

Aug. 2, 2011 (KR) .................. 10-2011-0077035

(51) Int. Cl.
*G09G 5/00* (2006.01)
*G09G 5/02* (2006.01)
*H04N 5/57* (2006.01)
*H04N 5/21* (2006.01)
*H04N 1/46* (2006.01)
*G03F 3/08* (2006.01)
*G06K 9/00* (2006.01)
*G06K 9/40* (2006.01)
*G06K 9/36* (2006.01)
*G06T 11/00* (2006.01)

(52) U.S. Cl.
CPC ................ *G09G 5/02* (2013.01); *G06T 11/001* (2013.01)
USPC ........... 345/590; 345/581; 345/606; 345/643; 345/690; 345/77; 348/602; 348/631; 348/687; 358/518; 358/522; 358/525; 382/167; 382/274; 382/276

(58) Field of Classification Search
USPC ......... 345/581, 589–590, 600–606, 617–619, 345/643, 204, 207, 690, 48, 63, 76–77, 345/84–88; 348/68–71, 216, 223, 234–238, 348/254, 552, 557, 560, 571, 602, 612, 348/630–631, 655, 671–672, 673–675, 687, 348/708, 712–713; 358/509, 515–518, 522, 358/525; 382/162, 166–167, 254, 274, 276, 382/300
See application file for complete search history.

(56) References Cited

U.S. PATENT DOCUMENTS 5,557,358 A * 9/1996 Mukai et al. .................. 396/296
7,688,294 B2   3/2010 Baik
(Continued)

FOREIGN PATENT DOCUMENTS

JP    2008-158399 A    7/2008
JP    2009-300517 A    12/2009
(Continued)

OTHER PUBLICATIONS

European Search Report mailed Dec. 6, 2013 in Application No. 12156541.0, filed Feb. 22, 2012.

*Primary Examiner* — Wesner Sajous
(74) *Attorney, Agent, or Firm* — Knobbe, Martens, Olson & Bear, LLP

(57) ABSTRACT

A display apparatus, which adjusts a luminance value of an image, and a method for driving the same are disclosed. The display apparatus includes a first image conversion unit that converts first image data into a plurality of second image data each including a luminance value, a luminance analysis unit that determines quantities of luminance values of the second image data, and determines a distribution of the luminance values, and a luminance adjustment unit that adjusts the respective luminance values of the second image data based on the quantities.

33 Claims, 16 Drawing Sheets

(56) References Cited

U.S. PATENT DOCUMENTS

| | | | |
|---|---|---|---|
| 7,839,455 B2* | 11/2010 | Harada | 348/672 |
| 2003/0007687 A1* | 1/2003 | Nesterov et al. | 382/167 |
| 2004/0258324 A1 | 12/2004 | Liang et al. | |
| 2007/0046827 A1* | 3/2007 | Harada | 348/672 |
| 2007/0127783 A1* | 6/2007 | Kuramoto et al. | 382/115 |
| 2008/0309787 A1* | 12/2008 | Notsu et al. | 348/222.1 |
| 2009/0040311 A1* | 2/2009 | Okamoto et al. | 348/181 |
| 2009/0067713 A1 | 3/2009 | Chen et al. | |
| 2009/0208099 A1 | 8/2009 | Yoshii et al. | |
| 2011/0164049 A1* | 7/2011 | Kobayashi | 345/589 |

FOREIGN PATENT DOCUMENTS

| | | |
|---|---|---|
| KR | 10-2008-0081644 A | 9/2008 |
| KR | 10-2009-0041994 A | 4/2009 |

* cited by examiner

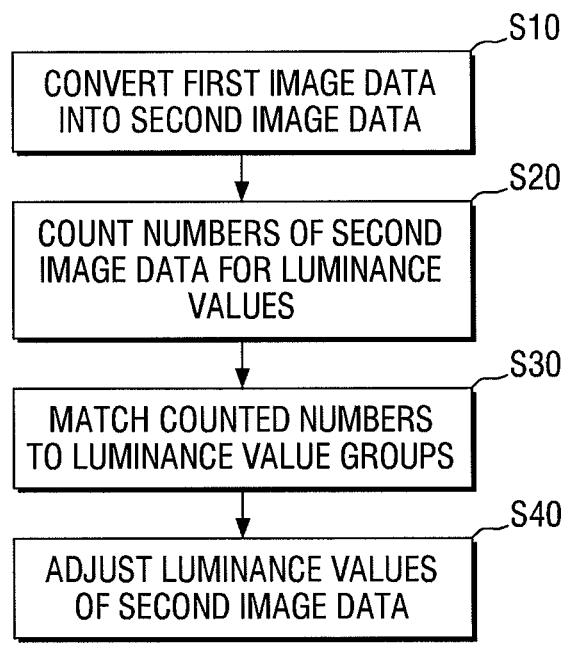

DISPLAY APPARATUS AND METHOD FOR DRIVING THE SAME

CROSS-REFERENCE TO RELATED APPLICATIONS

This application claims priority from Korean Patent Application No. 10-2011-0077035 filed on Aug. 2, 2011 in the Korean Intellectual Property Office, the disclosure of which is incorporated herein by reference in its entirety.

BACKGROUND

1. Field

The disclosed technology relates to a display apparatus and a method for driving the same. The display apparatus, which adjusts a luminance value of an image, and a method for driving the same are disclosed.

2. Description of the Related Technology

In general, there are numerous color producing methods for an image display field. For example, three primary colors of red, green and blue may be mixed with one another and then displayed on a display apparatus using R (Red), G (Green) and B (Blue) signals. In addition, as another representative color space used in the printing field, a CMY color model may be used. According to the CMY color model, colors of cyan, magenta and yellow may be used on a display apparatus using C (Cyan), M (Magenta) and Y (Yellow) signals. Further, using a Y (Luminance), Cb (B-color difference) and Cr (R-color difference) color model, images may be displayed using gamma-converted luminance and chrominance component signals. Additionally, a color model using H (Hue), S (Saturation) and V (Value), which effectively portrays human features, is widely used in extracting characteristic vectors of an image.

In order to achieve a low power display in the signal conversion process, various studies are being conducted, including a method of limiting the maximum luminance or hue.

SUMMARY OF CERTAIN INVENTIVE ASPECTS

One inventive aspect is a display apparatus. The display apparatus includes a first image conversion unit configured to convert first image data forming an image frame into second image data including a plurality of luminance values, and a luminance analysis unit configured to determine quantities of luminance values of the second image data, and configured to determine a distribution of the luminance values. The distribution includes luminance value groups each including one or more luminance values, and the display apparatus also includes a luminance adjustment unit configured to adjust the respective luminance values of the second image data based on the distribution of luminance values of the second image data.

Another inventive aspect is a display apparatus. The display apparatus includes a luminance analysis unit configured to determine quantities of luminance values of image data forming an image frame and having respective luminance values, and configured to determine a distribution of the luminance values. The distribution includes luminance value groups each including the respective luminance values, and the display apparatus also includes a luminance adjustment unit configured to adjust the respective luminance values of the image data based on the distribution of luminance values of the image data.

Another inventive aspect is a display apparatus. The display apparatus includes a first operation unit configured to receive an average of second color first data and second color second data of first image data and to convert the average into second color third data. The first image data includes first color data, second color first data, second color second data and third color data. The display apparatus also includes a second operation unit configured to determine a first difference value between the second color first data and the second color third data, and a second difference value between the second color second data and the second color third data, and a variable conversion unit configured to convert the first color data, the second color third data, and the third color data into the second image data including the luminance values, the first color chrominance value, and the third color chrominance value.

Another inventive aspect is a method of driving a display apparatus. The method includes converting a plurality of first image data forming an image frame into a plurality of second image data each including a luminance value, determining quantities of the second image data for the respective luminance values, determining a distribution of the luminance values, where the distribution includes luminance value groups each including one or more luminance values, and adjusting the respective luminance values of the second image data based on the distribution of luminance values of the second image data.

BRIEF DESCRIPTION OF THE DRAWINGS

The above and other features and advantages are described in detail according to certain embodiments with reference to the attached drawings in which:

FIG. 16 is a flow chart illustrating a method for driving a display apparatus according to an embodiment of the present invention.

DETAILED DESCRIPTION OF CERTAIN INVENTIVE EMBODIMENTS

Figure 1:
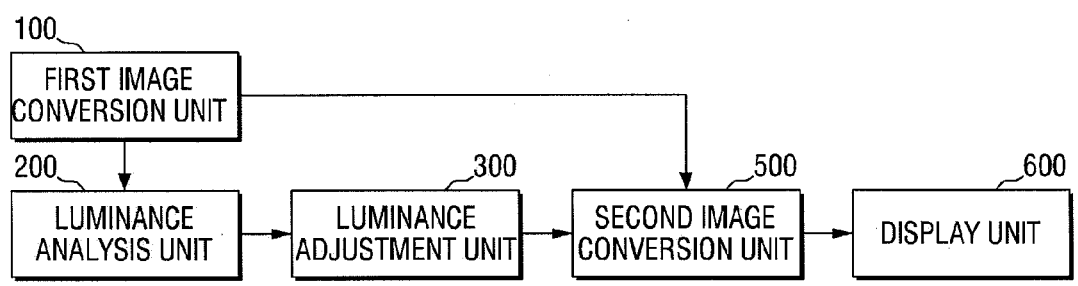
FIG. 1 is a block diagram of a display apparatus according to an embodiment.

Certain aspects and features of systems and methods may be understood more readily by reference to the following detailed description and the accompanying drawings. The present invention may, however, be embodied in many different forms and should not be construed as being limited to the embodiments set forth herein. Rather, these embodiments are provided so that this disclosure will be thorough and complete. In some embodiments, well-known structures and devices may not be shown in order not to obscure the description with unnecessary detail. Like numbers generally refer to like elements throughout. In the drawings, the thickness of layers and regions may be exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the invention. Accordingly, the exemplary views may be modified depending on manufacturing technologies and/or tolerances. Therefore, the embodiments are not limited to those shown in the views, but include modifications in configurations formed on the basis of manufacturing processes. Therefore, regions exemplified in figures have schematic properties and shapes of regions shown in figures exemplify specific shapes of regions of elements.

A display apparatus according to some embodiments includes an apparatus for displaying picture images, and examples thereof may include a liquid crystal display (LCD), an electrophoretic display (EPD), an organic light emitting diode (OLED), an LED, an organic electro luminescent (EL) display, a field emission display (FED), a surface-conduction electron-emitter display (SED), a plasma display panel (PDP), and a cathode ray tube (CRT) display apparatus. Hereinafter, embodiments are described in further detail with reference to the accompanying drawings.

FIG. 1 is a block diagram of a display apparatus according to an embodiment. Referring to FIG. 1, the display apparatus 1000 includes a first image conversion unit 100, a luminance analysis unit 200 and a luminance adjustment unit 300. In addition, the display apparatus 1000 may further include a second image conversion unit 500 and a display unit 600.

Figure 2:
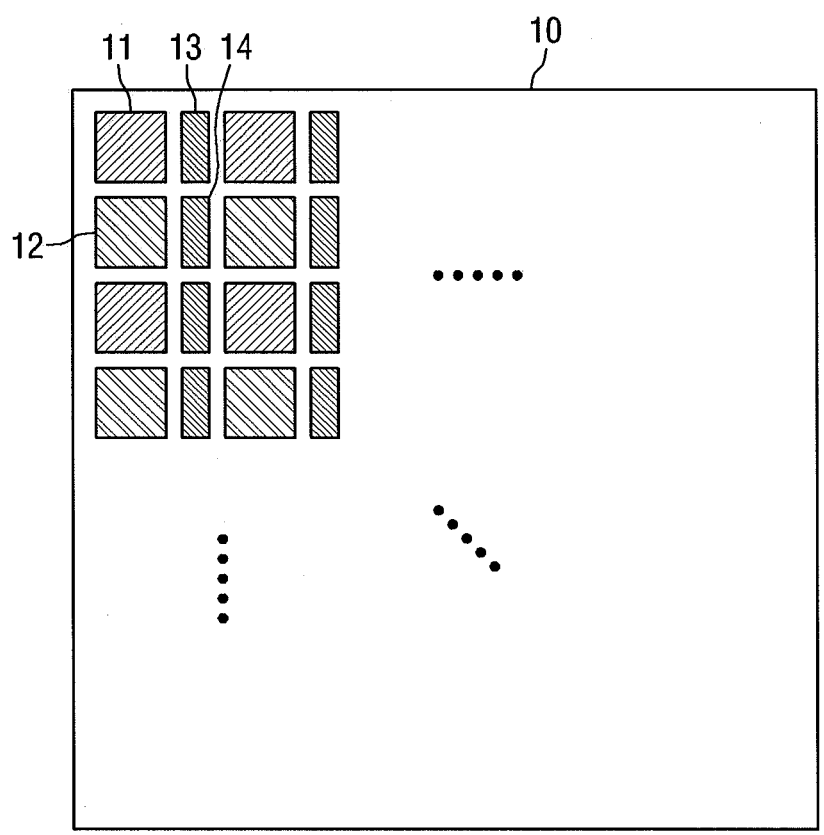
FIG. 2 is a plan view schematically illustrating a display unit according to an embodiment.

FIG. 2 is a plan view schematically illustrating a display unit according to an embodiment. Referring to FIG. 2, the display unit 10 includes a plurality of pixels 11, 12, 13 and 14. The plurality of pixels 11, 12, 13 and 14 may be arranged in a matrix formation.

The plurality of pixels 11, 12, 13 and 14 may include two or more different color pixels. In some embodiments, the plurality of pixels 11, 12, 13 and 14 may include a first color pixel 11, second color pixels 13 and 14, and a third color pixel 12. Here, the first color pixel 11 is a red (R) pixel, the second color pixels 13 and 14 are green (G) pixels, and the third color pixel 12 is a blue (B) pixel.

The RGB pixels may be alternately arranged. In some embodiments, the RGB pixels may be arranged in a stripe or dot pattern alternately arranged in a column-wise or row-wise direction.

In some other embodiments, as shown in FIG. 2, pixels may be arranged in a pen tile configuration. In the embodiment shown in FIG. 2, numbers of R pixels and B pixels are equal to each other, while the number of G pixels is two times the number of the R pixels or the B pixels. R pixels and B pixels are alternately arranged in a jth column, and only G pixels are arranged in a (j+1)th column adjacent to the jth column. Meanwhile, every other G pixels are arranged in an ith row, and R and B pixels are arranged between the G pixels. The R and B pixels are also alternately arranged in the column-wise direction.

The image data that is generally used may include R/G/B data. Here, the R data, G data and B data exist in a ratio of 1:1:1. However, since a ratio of R pixels:G pixels:B pixels is 1:2:1 in the pixel arrangement shown in FIG. 2, it is difficult to drive the display unit using the general R/G/B data. Therefore, the R/G/B data may be converted into RG/BG data using a panel driver circuit. The panel driver circuit may be provided outside the display apparatus or may be incorporated into the display apparatus. In this embodiment, it is assumed that the data input to the display apparatus is RG1/BG2 data suitable to the pixel arrangement. Here, G1 refers to green first data and G2 green second data. The original input image data may be RG1/BG2 data, or R/G/B data converted from RG1/BG2 using an external panel driver circuit.

Figure 3:
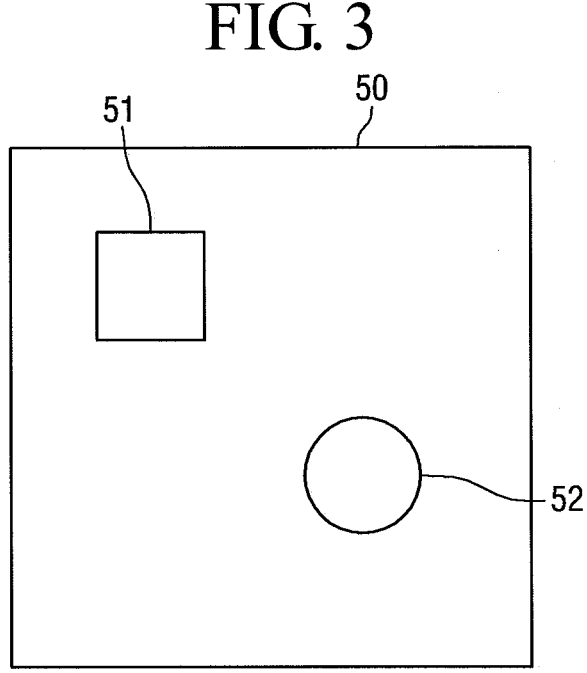
FIG. 3 is a plan view schematically illustrating an image frame according to an embodiment.

Referring back to FIG. 1, as described above, the first image conversion unit 100 receives RG1/BG2 data as first image data. Since the display unit 10 includes a plurality of RG1/BG2 pixels, the RG1/BG2 data also include a plurality of data. The plurality of RG1/BG2 data may form frames 50, 51 and 52 for one image, as shown in FIG. 3. The one image frames 50, 51 and 52 include all or part of one frame image or still image. As shown in FIG. 3, the one image frames 50, 51 and 52 may be defined as the entire screen (50) of the display unit 10, or a partial screen (51, 52) forming a specific block. Here, the specific block may be a region of interest to be subjected to luminance conversion. In some embodiments, the specific block may be a different window frame within the entire screen.

Figure 4:
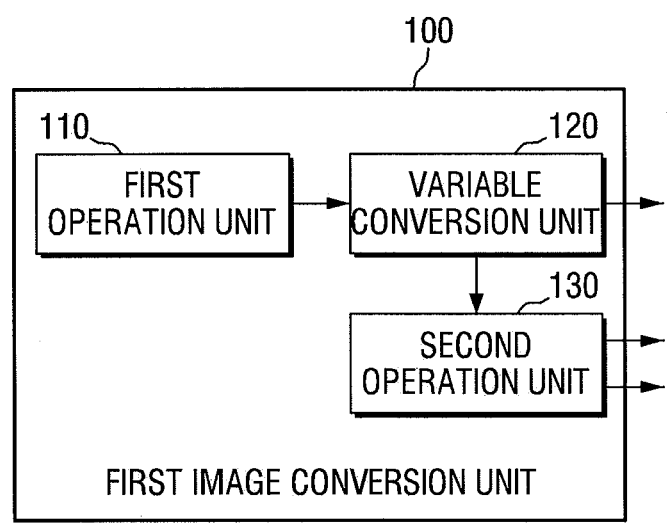
FIG. 4 is a detailed block diagram illustrating an example structure of a first image conversion unit shown in FIG. 1.

The first image conversion unit 100 converts the received plurality of RG1/BG2 data into image data including luminance values, which will be described in more detail with reference to FIG. 4. FIG. 4 is a detailed block diagram illustrating an example structure of a first image conversion unit shown in FIG. 1. Referring to FIG. 4, the first image conversion unit 100 may include a first operation unit 110, a variable conversion unit 120, and a second operation unit 130.

The first operation unit 110 receives RG1/BG2 and converts the same into RG3B data. Here, G3 may be obtained using Equation 1:

$$G3=(G1+G2)/2 \qquad \text{Equation 1}$$

The variable conversion unit 120 receives the RG3B data from the first operation unit 110 and converts the same into second image data. The second image data may include luminance values and chrominance values. In some embodiments, one luminance value (Y) and two chrominance values may be converted from one of the first image data. The chrominance values may include a blue chrominance value (Cb) and a red chrominance value (Cr).

The second operation unit 130 receives the G3 data from the first operation unit 110 and outputs a difference value G13 between the G3 data and G1 data and a difference value G23 between the G3 data and G2 data. The difference value G13 between the G3 data and G1 data and the difference value G23 between the G3 data and G2 data can be computed using Equations 2 and 3:

$$G13 = G1 - G3 \quad \text{Equation 2}$$

$$G23 = G2 - G3 \quad \text{Equation 3}$$

The G13 and G23 obtained by the second operation unit 130 may be input to the second image conversion unit 500 to be described later.

Figure 5:
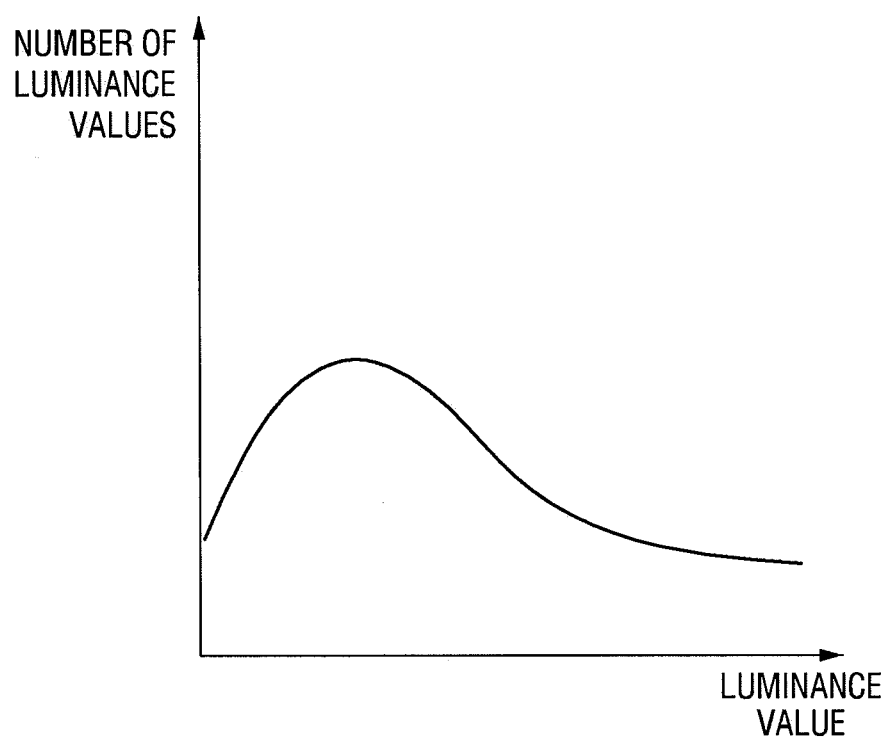
FIG. 5 is a graph illustrating a relationship between luminance values and numbers of second image data for the respective luminance values.

Referring back to FIG. 1, YCbCr data (or Y values of YCbCr data) output from the first image conversion unit 100 is input to the luminance analysis unit 200. The luminance analysis unit 200 sums numbers of the second image data for luminance levels and matches the same to the respective luminance levels. Accordingly, the luminance analysis unit 200 determines a distribution of luminance levels. First, assuming that the YCbCr data output from the first image conversion unit 100 is obtained by converting RG1/BG2 data forming frames for an image, the numbers of all of the YCbCr data input to the luminance analysis unit 200 can be computed for the respective luminance levels. The numbers of all of the YCbCr data for the respective luminance levels can be computed as the number of target YCbCr data having the same Y value. As illustrated in FIG. 5, the computed numbers are matched to the respective luminance values.

Meanwhile, the numbers of luminance values may be counted as natural numbers, which may be discrete numbers. In addition, the luminance values may also be discrete numbers if they are based on digital input values. In this case, a graph illustrating a discontinuous distribution may be obtained by matching the counted numbers to the luminance values. While FIG. 5 illustrates a continuous curve for a better understanding, a discontinuous graph may be formed in practice, which may also apply to the following graphs.

In some other embodiments, a plurality of luminance values may be classified into two or more luminance value groups of the distribution. Each of the two or more luminance value groups may include one or more luminance values. In some embodiments, each of the two or more luminance value groups may include continuous luminance values or two or more adjacent luminance values.

Figure 6:
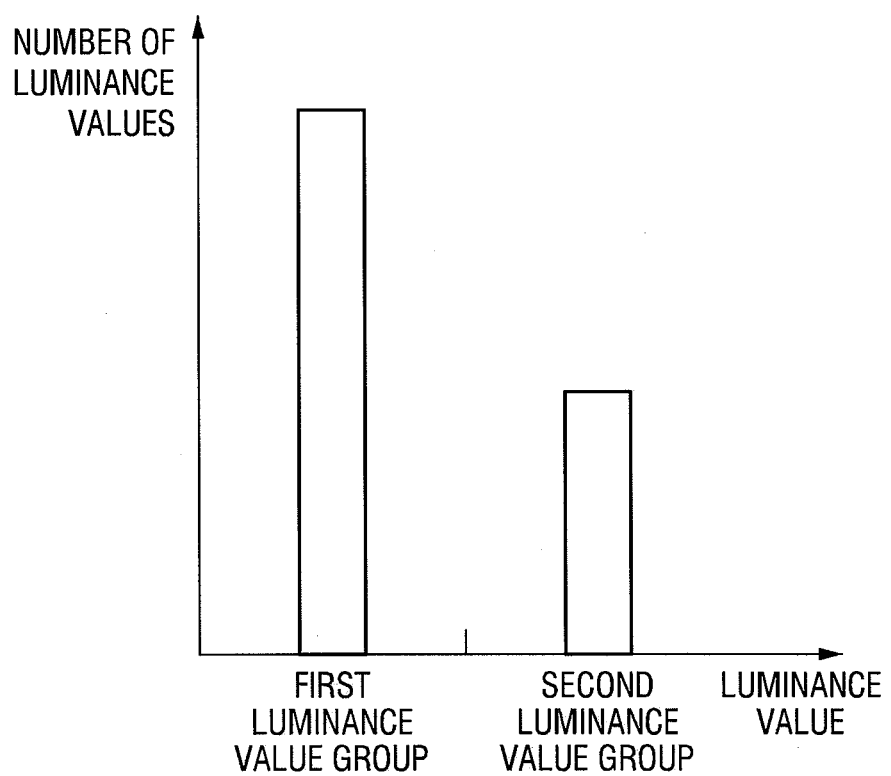
FIG. 6 is a graph illustrating a relationship between luminance value groups and numbers of second image data for the respective luminance value groups.
Figure 8:
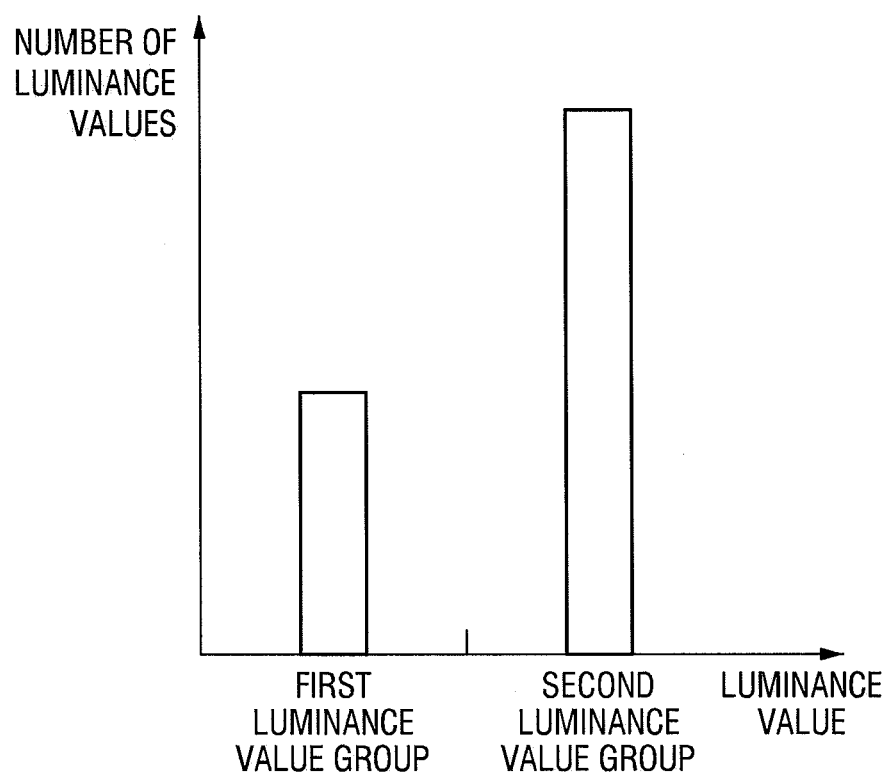
FIG. 8 is a graph illustrating a relationship between luminance value groups and numbers of second image data for the respective luminance value groups.

For example, as shown in the distributions of FIGS. 6 and 8, the plurality of luminance value groups may include a first luminance value group and a second luminance value group. Each of the first luminance value group and the second luminance value group may include one or more luminance values. In an exemplary embodiment, the minimum luminance value of the second luminance value group may be greater than the maximum luminance value of the first luminance value group.

In some embodiments, if a section between the minimum and maximum values of the luminance values is an entire luminance value section, the minimum value of the luminance values may be the minimum luminance value of the first luminance value group, and the maximum value of the luminance values may be the maximum luminance value of the second luminance value group. In addition, a boundary between the first luminance value group and the second luminance value group may be formed by dividing the entire luminance value section in a ratio of 1:1. However, the dividing of the luminance value groups is not limited to the illustrated example.

When the luminance values of each luminance value group is 2 or greater, the numbers of the plurality of luminance values of the respective luminance value groups are matched to a total of the numbers.

Referring back to FIG. 1, the numbers of second image data belonging to the respective luminance value group are input to the luminance adjustment unit 300. The luminance adjustment unit 300 adjusts the luminance values of the second image data based on the input numbers of the second image data.

Figure 7:
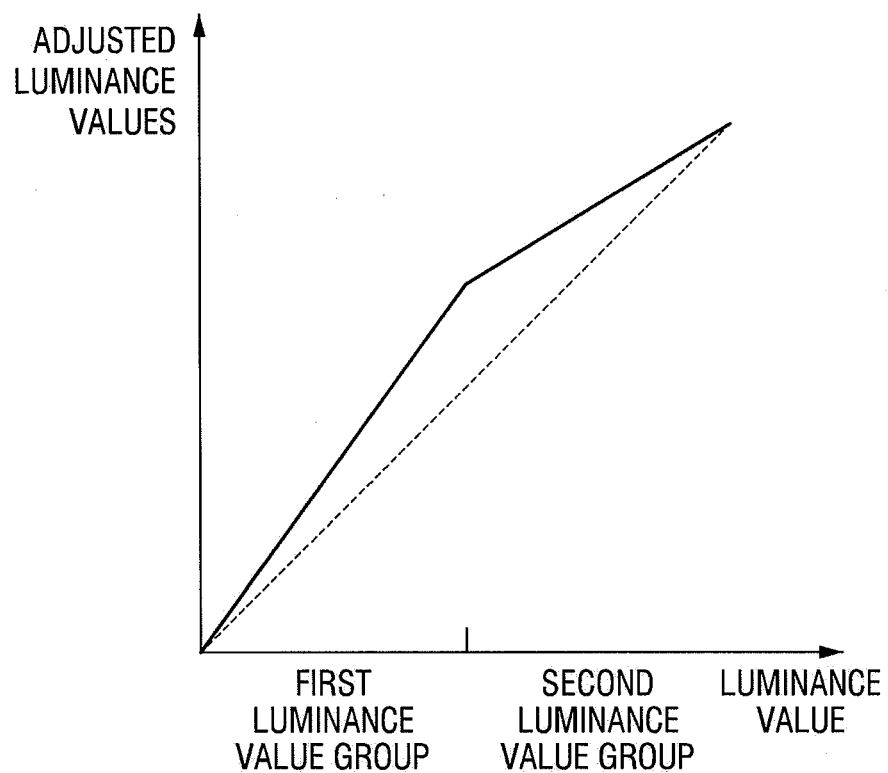
FIG. 7 is a graph illustrating a relationship between original luminance values of second image data and adjusted luminance values.

For example, as shown in FIG. 6, when the number of the second image data belonging to the first luminance value group exceeds the number of the second image data belonging to the second luminance value group, or the number of the second image data belonging to the first luminance value group exceeds a threshold value, e.g., ½ the number of second image data forming frames for an image, or when the luminance adjustment unit adjusts a variation rate of adjusted luminance value with respect to the luminance values of each of the luminance value groups to be greater than 1, and when the number of the second image data belonging to the first luminance value group is less than the threshold value (that is, when the number of the second luminance value group is less than ½ the number of second image data forming frames for an image), the respective luminance values can be adjusted by the method illustrated in FIG. 7.

FIG. 7 is a graph illustrating a relationship between original luminance values of second image data and adjusted luminance values. Referring to FIG. 7, a variation rate of adjusted luminance values (Y') with respect to a variation rate of luminance values (Y) in a first luminance value group section is adjusted to be greater than a variation rate of adjusted luminance values (Y') with respect to a variation rate of luminance values (Y) in a second luminance value group section.

In detail, a slope in the graph for the adjusted luminance values in the first luminance value group section may be adjusted to be greater than 1. That is to say, a variation rate of adjusted luminance values (Y') with respect to the input luminance values (Y) is greater than 1 in the first luminance value group section. On the other hand, a slope in the graph for the adjusted luminance values in the second luminance value group section may be adjusted to be less than 1. That is to say, a variation rate of adjusted luminance values (Y') with respect to the input luminance values (Y) is less than 1 in the first luminance value group section. Meanwhile, the graph for the adjusted luminance values in a boundary between the first luminance value group section and the second luminance value group section may be a continuous graph. In addition, the minimum luminance value of the first luminance value group and the maximum luminance value of the second luminance value group may be equal to input luminance values.

The luminance value adjustment increases a luminance value difference in the first luminance value group section in which luminance values are relatively low while decreasing a luminance value difference in the second luminance value group section in which luminance values are relatively high. Therefore, the second image data belonging to the first luminance value group, which includes a relatively large number of pixels, can be more distinctly distinguished than the second image data belonging to the second luminance value group.

Further, even if the overall levels of luminance values are decreased, luminance values of more pixels can be easily divided, thereby enhancing visibility. This can be utilized in selectively enhancing visibility of a primary display image when the number of pixels belonging to a luminance value group is proportional to the significance of an image to be displayed.

The variation rate of adjusted luminance values (Y') with respect to input luminance values (Y) in each luminance value group section may be adjusted according to criteria including the difference between numbers of image data for the respective luminance value groups, the improvement extent of visibility, adjustment or non-adjustment of the overall luminance values and adjustment scale. In an exemplary embodiment, a variation rate of adjusted luminance values (Y') with respect to input luminance values (Y) in the first luminance value group may be adjusted to approximately 1.1 or 1.2, and a variation rate in the second luminance value group may be adjusted to approximately 0.9 or 0.8, but not limited thereto.

Figure 9:
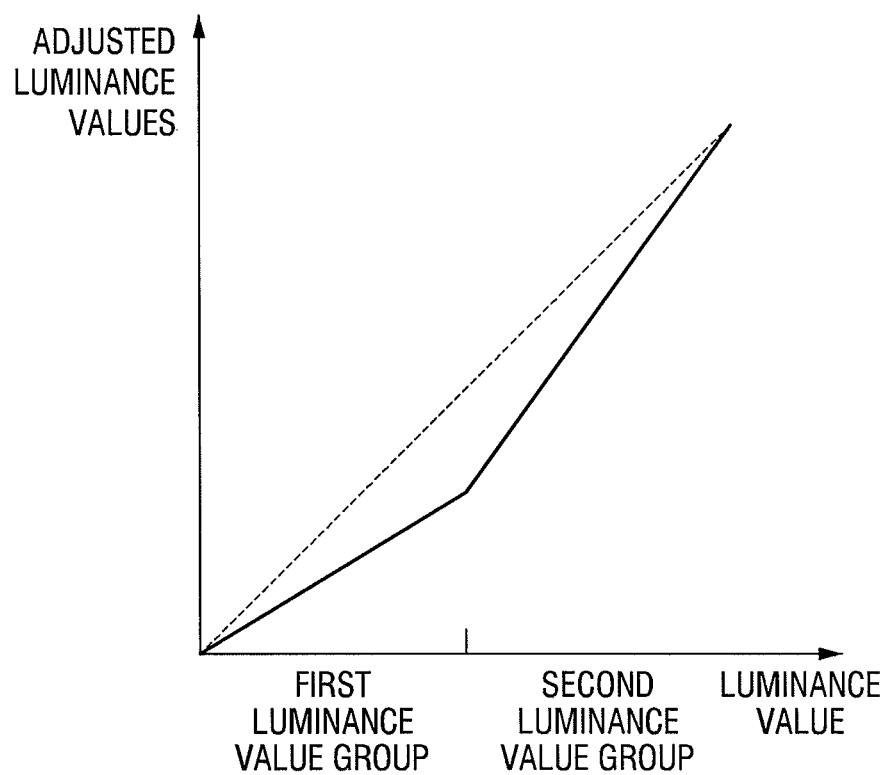
FIG. 9 is a graph illustrating a relationship between original luminance values of second image data and adjusted luminance values.

FIG. 8 illustrates that the number of second image data belonging to the second luminance value group having relatively high luminance is larger than the number of second image data belonging to the first luminance value group having relatively low luminance. FIG. 9 illustrates that luminance values are adjusted by the luminance adjustment unit 300. Referring to FIGS. 8 and 9, since the number of second image data of the second luminance value group is larger than that of the first luminance value group, a variation rate of adjusted luminance values (Y') with respect to a variation rate of input luminance values (Y) in the first luminance value group section is adjusted to be greater than 1 and a variation rate of adjusted luminance values (Y') with respect to a variation rate of input luminance values (Y) in the second luminance value group section is adjusted to be less than 1.

As shown in FIGS. 8 and 9, if a total of adjusted luminance values is increased or reduced compared to a total of input luminance values, power consumed may also be varied. To avoid this, the luminance adjustment unit 300 may proportionately readjust the respective adjusted luminance values so that the total of the adjusted luminance values is 100%. For example, if the total of adjusted luminance values is increased by 10% compared to the total of input luminance values, the adjusted luminance values can be readjusted by multiplying the respective adjusted luminance values by an inverse of 1.1.

Figure 10:
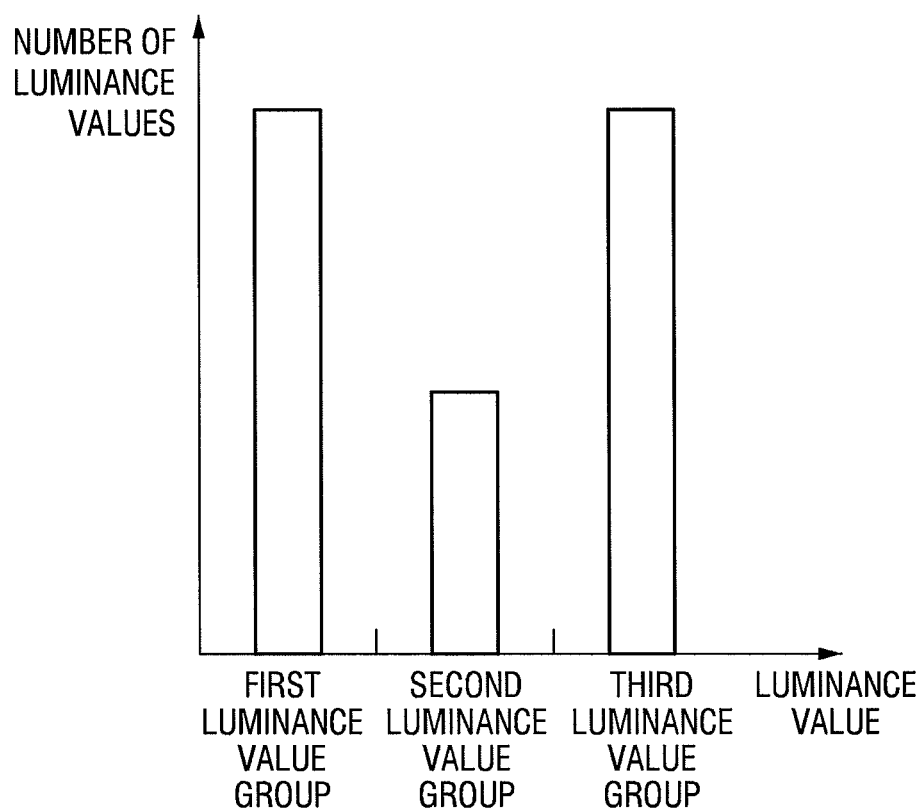
FIG. 10 is a graph illustrating a relationship between luminance value groups and numbers of second image data for the respective luminance value groups.
Figure 11:
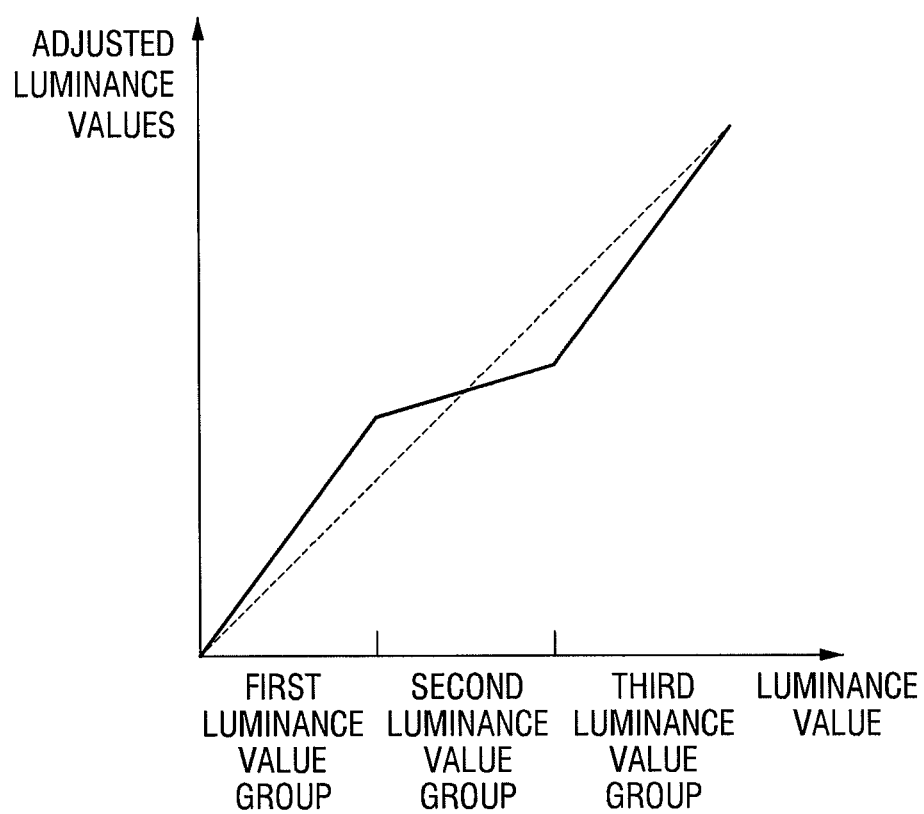
FIG. 11 is a graph illustrating a relationship between original luminance values of second image data and adjusted luminance values.
Figure 12:
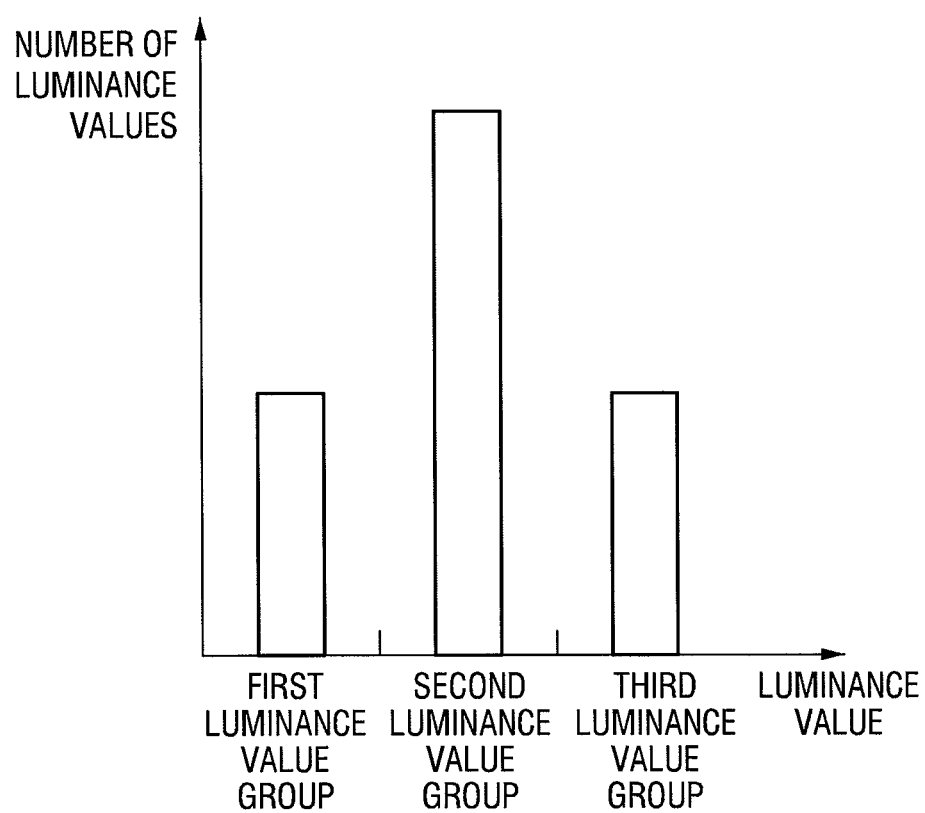
FIG. 12 is a graph illustrating a relationship between luminance value groups and numbers of second image data for the respective luminance value groups.

In embodiments shown in FIGS. 10 to 12, distributions having a plurality of luminance value groups include a first luminance value group, a second luminance value group, and a third luminance value group. In some embodiments, if a section ranging between the minimum and maximum values of all luminance values is an entire luminance value section, the minimum value of all of the luminance values may be the minimum luminance value of the first luminance value group, and the maximum value of all of the luminance values may be the maximum luminance value of the third luminance value group. In addition, a boundary between the first luminance value group and the second luminance value group may be formed by dividing the entire luminance value section in a ratio of 1:2, and a boundary between the second luminance value group and the third luminance value group may be formed by dividing the entire luminance value section in a ratio of 2:1. However, the dividing of the luminance value groups is not limited to the illustrated example.

Referring to FIG. 10, the number of the second image data belonging to the first luminance value group and the number of the second image data belonging to the third luminance value group are greater than a threshold value, while the number of the second image data belonging to the second luminance value group is less than the threshold value. For example, the threshold value may be, but is not limited to, ⅓ a total number of the second image data input to the luminance adjustment unit 300.

As shown in FIG. 11, the luminance adjustment unit 300 adjusts luminance values of the first luminance value group and the third luminance value group, which exceeds the threshold value, thereby adjusting a variation rate of adjusted luminance values (Y') with respect to input luminance values (Y) to be greater than 1. In addition, for luminance values of the second luminance value group, which are less than the threshold value, a variation rate of adjusted luminance values (Y') with respect to input luminance values (Y) is adjusted to be greater than 1.

Meanwhile, the graph for the adjusted luminance values may be a continuous graph at a boundary between the first luminance value group section and the second luminance value group section and a boundary between the second luminance value group section and the third luminance value group section. In addition, the minimum luminance value of the first luminance value group and the maximum luminance value of the third luminance value group may be equal to input luminance values.

As described above, the variation rate of adjusted luminance values (Y') with respect to input luminance values (Y) in each luminance value group section may be adjusted according to criteria including the difference between numbers of image data for the respective luminance value groups, the improvement extent of visibility, adjustment or non-adjustment of the overall luminance values and adjustment scale.

The variation rates of adjusted luminance values (Y') with respect to input luminance values (Y) in the first luminance value group and the third luminance value group exceeding the critical value may be equal to each other irrespective of the excess extent of the respective luminance value groups. In some embodiments, the variation rate of either of the first luminance value group or the third luminance value group, whichever has more luminance values exceeding the critical value, may be adjusted to be greater than the other. In some other embodiments, 2 or more critical values may be assigned, thereby adjusting the variation rate adjustment extent differently according to whether the luminance values exceed the respective critical values.

Referring to FIG. 12, in this embodiment, the numbers of second image data belonging to the first luminance value group and the third luminance value group are less than a predetermined critical value, while the number of second image data belonging to the second luminance value group is greater than the predetermined critical value. The predetermined critical value may be, but not limited to, ⅓ a total number of the second image data input to the luminance adjustment unit 300.

Figure 13:
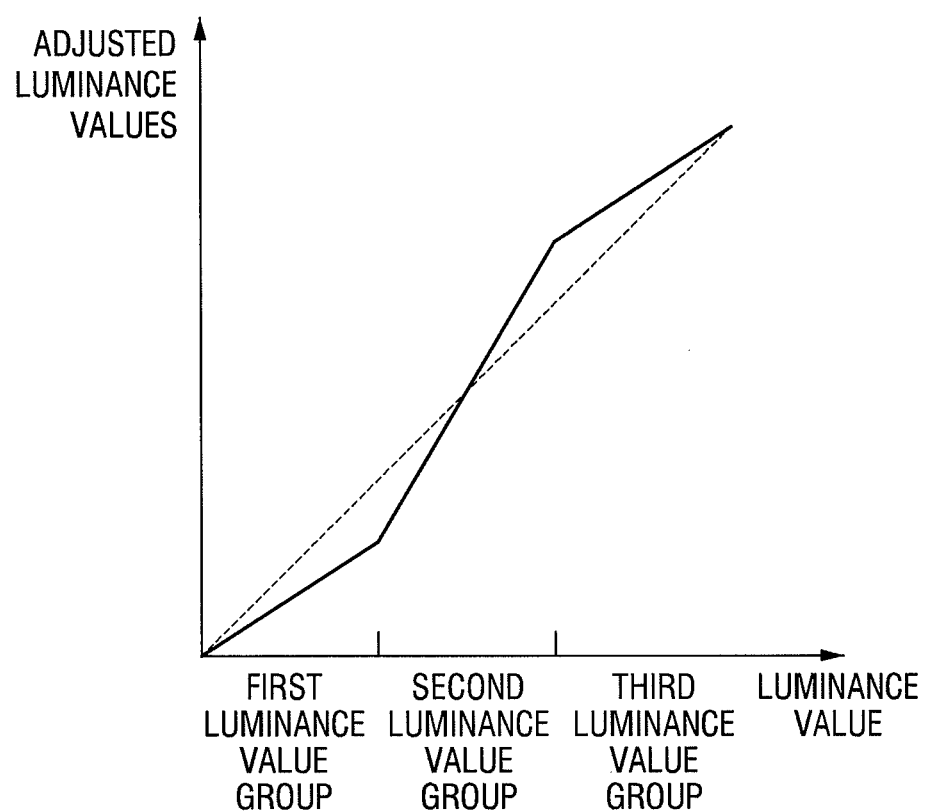
FIG. 13 is a graph illustrating a relationship between original luminance values of second image data and adjusted luminance values.

Referring to FIG. 13, since the number of second image data belonging to the second luminance value group is greater than the threshold value, a variation rate of adjusted luminance values (Y') with respect to the input luminance values (Y) is adjusted to be greater than 1 in the second luminance value group section, while variation rates of adjusted luminance values (Y') with respect to the input luminance values (Y) are adjusted to be less than 1 in the first luminance value group section and the third luminance value group section.

Referring back to FIG. 1, the luminance adjustment unit 300 may generally readjust the respective adjusted luminance values. To this end, the luminance adjustment unit 300 may further include a luminance level shift unit (not shown). In an exemplary embodiment, the luminance level shift unit may receive a consumption current limit signal indicating a consumption current limit ratio and may reduce all of the luminance values according to the consumption current limit ratio.

Targets to be down shifted may be adjusted luminance values. Readjusted luminance values (Y″) may be computed using Equation 4:

$$Y''=Y'*B \quad \text{Equation 4}$$

wherein Y' is an adjusted luminance value and B is a consumption current limit ratio.

For example, when the received consumption current limit ratio is 50%, all of the adjusted luminance values (Y') are reduced to 50%. Here, as described above, in the luminance value group section in which the variation rate of adjusted luminance values (Y') with respect to the input luminance values (Y) is adjusted to be greater than 1, even if the luminance values are reduced by 50%, a greater luminance difference between gray scales can be ensured than with original data, thereby enhancing visibility.

The second image conversion unit 500 receives adjusted or readjusted luminance values (Y' or Y″) from the luminance adjustment unit 300 or chrominance values (G13, G23) output from the first image conversion unit 100, generates R'G1'/B'G2' data as third image data, and outputs the same to the display unit 600. Here, the R'G1'/B'G2' data are inversely converted data. Thus, R', G1', B' and G2' may be referred to as inversely converted R' data, inversely converted G1' data, inversely converted B' data and inversely converted G2' data, respectively.

Figure 14:
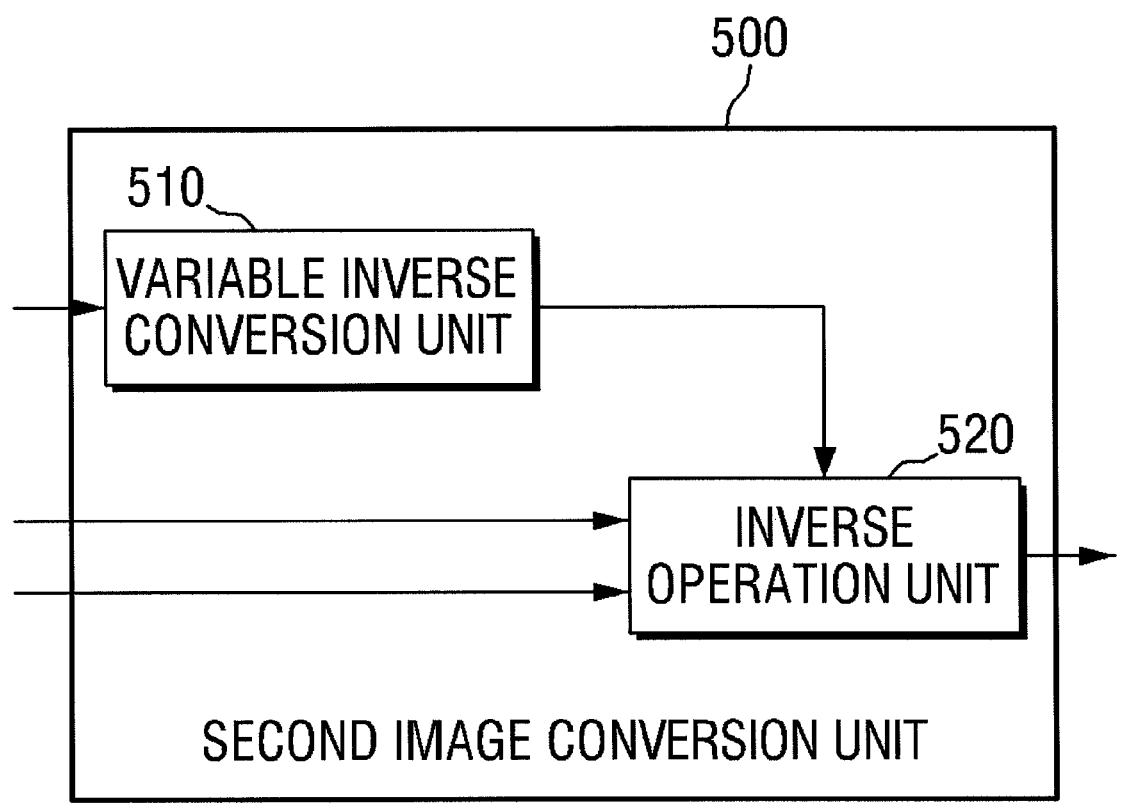
FIG. 14 is a block diagram of an example structure of a second image conversion unit shown in FIG. 1.

FIG. 14 is a block diagram of an example structure of a second image conversion unit shown in FIG. 1. Referring to FIG. 14, the second image conversion unit 500 is described in more detail. The second image conversion unit 500 may include a variable inverse conversion unit 510, and an inverse operation unit 520.

The variable inverse conversion unit 510 receives Y'CbCr or Y″CbCr data from the luminance adjustment unit and inversely converts the same into R'G4B' data. The inverse operation unit 520 receives the R'G4B' data from the variable inverse conversion unit 510, receives G13 and G23 data from the second operation unit 130 of the first image conversion unit 100, and performs operations of G1' data and G2' data using the data. The G1' data and G2' data are computed using Equation 5:

$$G1'=G4+G13 \quad \text{Equation 5.}$$

$$G2'=G4+G23 \quad \text{Equation 6.}$$

The inverse operation unit 520 generates third image data, that is, R'G1' data and B'G2' data, using the computed data, and outputs the generated R'G1' data and B'G2' data to the display unit 600. The display unit 600 displays an adjusted image frame using the third image data R'G1'/B'G2' data.

In the display apparatus of the above-described embodiments, pixels are arranged in a pen tile configuration, and RG1/BG2 input data are converted into R'G1'/R'G2' data to then be input to the display unit. However, the above described concepts may be applied to a real type pixel arrangement in which R, G, B pixels are alternately arranged in a stripe or dot pattern. In this case, the converting of RG1/BG2 into R/G3/B and the converting of R/G4/B into R'G1'/B'G2' in the above-described embodiments may be skipped.

Figure 15:
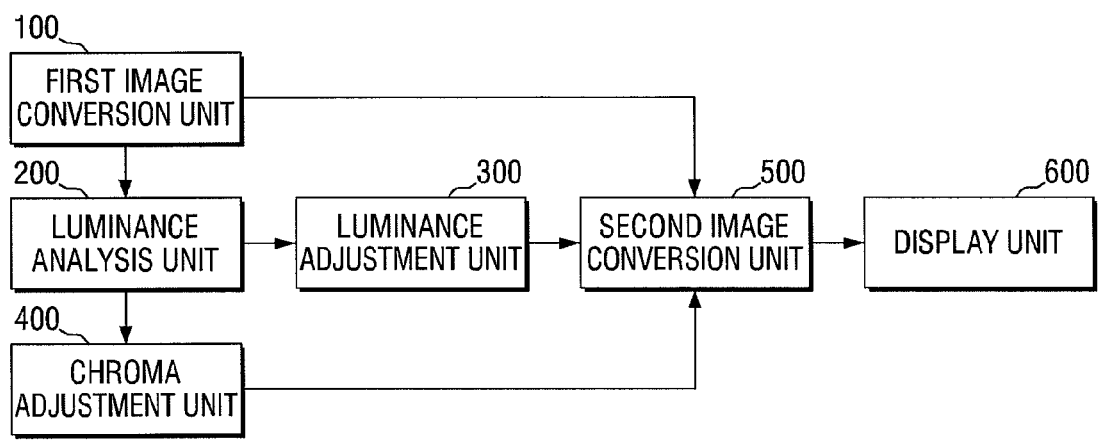
FIG. 15 is a block diagram of a display apparatus according to another embodiment of the present invention.

FIG. 15 is a block diagram of a display apparatus according to another embodiment. Referring to FIG. 15, the display apparatus 2000 is different from the display apparatus according to the previous embodiment in that it further includes a chroma correction unit 400.

The chroma correction unit 400 may correct chrominance values of the second image data. As a luminance adjustment unit 300 adjusts luminance values of the second image data, brightness of an original image may be varied. The chroma correction unit 400 may correct chromas of the image increasing or decreasing according to the luminance value adjustment by the luminance adjustment unit 300.

In addition, a user may have a preference for a particular chroma and may demand viewing a desired image according to the preference chroma value. The chroma correction unit 400 may receive a user's preference chroma and may correct a chrominance value according to the received user's preference chroma. As described above, a sensitively enhanced image can be output by increasing or decreasing the chroma according to the changed luminance. In addition, enhanced visibility of the image can be provided by color adjustment.

FIG. 16 is a flow chart illustrating a method for driving a display apparatus according to an embodiment. The method for driving a display apparatus may include converting a plurality of first image data forming an image frame into a plurality of second image data each including a luminance value (S10). Converting of the image frame, first image data, second image data and first image data is substantially the same as that shown in FIGS. 1 to 15, and repeated explanations thereof will not be given.

Next, numbers of the second image data for the respective luminance values are counted (S20), and the counted numbers are summed and matched with a plurality of luminance value groups each including one or more luminance values (S30). The counting, summing and matching is substantially the same as that shown in FIGS. 1 to 15, and repeated explanations thereof will not be given.

Next, the respective luminance values of the second image data are adjusted based on the numbers of the second image data matched for the respective luminance value groups (S40). The adjusting of the respective luminance values of the second image data is substantially the same as that shown in FIGS. 1 to 15, and repeated explanations thereof will not be given.

In some inventive aspects, R/G/B data are converted into Y/Cb/Cr data and processed, thereby preventing a color change. Therefore, visibility can be enhanced by increasing brightness of an image in a limited brightness level, and a chroma is increased or decreased according to the brightness change, thereby outputting a sensitively enhanced image and providing for enhanced visibility of the image by color adjustment.

While the various aspects have been particularly shown and described with reference to exemplary embodiments, it will be understood by those of ordinary skill in the art that various changes in form and details may be made therein without departing from the spirit and scope of the present invention. It is therefore understood that the present embodiments are to be considered in all respects as illustrative and not restrictive.

What is claimed is:

1. A display apparatus comprising:
    a first image conversion unit configured to convert first image data forming an image frame into second image data including a plurality of luminance values;
    a luminance analysis unit configured to determine quantities of luminance values of the second image data, and configured to determine a distribution of the luminance values, wherein the distribution includes luminance value groups each including one or more luminance values and the luminance value groups include a first luminance value group and a second luminance value group, and the maximum luminance value of the first luminance value group is less than the minimum luminance value of the second luminance value group; and a luminance adjustment unit configured to adjust the respective luminance values of the second image data based on the distribution of luminance values of the second image data.

2. The display apparatus of claim 1, wherein the luminance adjustment unit is configured to adjust the respective luminance values of the second image data based on the number of the second image data belonging to the first luminance value group and the second luminance value group, and wherein the respective luminance values of the second image data belonging to the first luminance value group are adjusted according to the same criteria, and the respective luminance values of the second image data belonging to the second luminance value group are adjusted according to the same criteria.

3. The display apparatus of claim 2, wherein if the number of the second image data belonging to the first luminance value group exceeds a threshold value, the luminance adjustment unit adjusts a variation rate of adjusted luminance value with respect to the luminance values of each of the luminance value groups to be greater than 1, and if the number of the second image data belonging to the first luminance value group is less than the threshold value, the luminance adjustment unit adjusts the variation rate to be less than 1.

4. The display apparatus of claim 3, wherein the threshold value is ½ a total number of the second image data belonging to the first and second luminance value groups.

5. The display apparatus of claim 1, wherein the plurality of luminance value groups further includes a third luminance value group, wherein the maximum luminance value of the second luminance value group is less than the minimum luminance value of the third luminance value group.

6. The display apparatus of claim 5, wherein the luminance adjustment unit is configured to adjust the respective luminance values of the second image data based on the number of the second image data belonging to the first luminance value group, the second luminance value group and the third luminance value group, wherein the respective luminance values of the second image data belonging to the first luminance value group are adjusted according to the same criteria, the respective luminance values of the second image data belonging to the second luminance value group are adjusted according to the same criteria, and wherein the respective luminance values of the second image data belonging to the third luminance value group are adjusted according to the same criteria.

7. The display apparatus of claim 6, wherein if the number of the second image data belonging to the first luminance value group exceeds a threshold value, the luminance adjustment unit adjusts a variation rate of adjusted luminance value with respect to the luminance values of each of the luminance value groups to be greater than 1, and if the number of the second image data belonging to the first luminance value group is less than the threshold value, the luminance adjustment unit adjusts the variation rate to be less than 1.

8. The display apparatus of claim 7, wherein the threshold value is ⅓ a total number of the second image data belonging to the first, second and third luminance value groups.

9. The display apparatus of claim 1, further comprising a luminance level shift unit that is configured to shift levels of the luminance values according to a ratio.

10. The display apparatus of claim 9, wherein the luminance level shift unit is configured to receive a consumption current limit ratio and shifts levels of the luminance values according to the consumption current limit ratio.

11. The display apparatus of claim 1, wherein the first image data include first color data, second color data, and third color data, and the plurality of second image data include a first color chrominance value and a third color chrominance value.

12. The display apparatus of claim 1, wherein the first image data includes first color data, second color first data, second color second data, and third color data, and the first image conversion unit comprises:

a first operation unit configured to convert an average of the second color first data and the second color second data into second color third data;

a second operation unit configured to perform operations of a first difference value between the second color first data and the second color third data, and a second difference value between the second color second data and the second color third data; and a variable conversion unit configured to convert the first color data, the second color third data, and the third color data into the second image data including the luminance values, the first color chrominance value, and the third color chrominance value.

13. The display apparatus of claim 12, further comprising:

a second image conversion unit configure to convert the second image data including the adjusted luminance values into third image data; and a display unit configured to display the image frame using the third image data, wherein the third image data includes inversely converted first color data, inversely converted second color first data, inversely converted second color second data, and inversely converted third color data.

14. The display apparatus of claim 13, wherein the second image conversion unit comprises:

a variable inverse conversion unit configured to inversely convert the adjusted luminance values, the first color chrominance value and the third color chrominance value into the inversely converted first color data, the inversely converted second color data and the inversely converted third color data; and an inverse operation unit configured to add the first difference value to the inversely converted second color data to generate the inversely converted second color first data, and adds the second difference value to the inversely converted second color data to generate the inversely converted second color second data.

15. The display apparatus of claim 14, wherein the first color is red, the second color is green, and the third color is blue.

16. The display apparatus of claim 1, further comprising a chroma correction unit configured to correct chrominance values of the second image data.

17. The display apparatus of claim 16, wherein the chroma correction unit is configured to correct chrominance values of the second image data according to the adjusted luminance values by the luminance adjustment unit.

18. The display apparatus of claim 17, wherein the chroma correction unit is configured to correct chrominance values of the second image data according to the user's preference chroma.

19. A display apparatus comprising:

a luminance analysis unit configured to determine quantities of luminance values of image data forming an image frame and having respective luminance values, and configured to determine a distribution of the luminance values, wherein the distribution includes luminance value groups each including the respective luminance values, and wherein the luminance value groups include a first luminance value group, a second luminance value group, and a third luminance value group, and wherein the maximum luminance value of the first luminance value group is less than the minimum luminance value of the second luminance value group, and the maximum luminance value of the second luminance value group is less than the minimum luminance value of the second luminance value group; and a luminance adjustment unit configured to adjust the respective luminance values of the image data based on the distribution of luminance values of the image data.

20. The display apparatus of claim 19, wherein the luminance adjustment unit is configured to adjust the respective luminance values of the second image data based on the number of the second image data belonging to the first luminance value group, the second luminance value group and the third luminance value group, and wherein the respective luminance values of the image data belonging to the first luminance value group are adjusted according to the same criteria, the respective luminance values of the image data belonging to the second luminance value group are adjusted according to the same criteria, and the respective luminance values of the image data belonging to the third luminance value group are adjusted according to the same criteria.

21. The display apparatus of claim 20, wherein if the number of the image data belonging to each of the luminance value groups exceeds a threshold value, the luminance adjustment unit adjusts a variation rate of adjusted luminance value with respect to the luminance values of each of the luminance value groups to be greater than 1, and if the number of the image data belonging to each of the luminance value groups is less than the threshold value, the luminance adjustment unit adjusts the variation rate to be less than 1, and the critical value ⅓ a total number of the second image data belonging to the first, second and third luminance value groups.

22. The display apparatus of claim 19, wherein the luminance adjustment unit further comprises a luminance level shift unit configured to shift levels of the luminance values according to a ratio, wherein the luminance level shift unit is configured to receive a consumption current limit ratio and shifts levels of the luminance values according to the consumption current limit ratio.

23. A display apparatus comprising:
a first operation unit configured to receive an average of second color first data and second color second data of first image data and to convert the average into second color third data, the first image data including first color data, second color first data, second color second data and third color data;
a second operation unit configured to determine a first difference value between the second color first data and the second color third data, and a second difference value between the second color second data and the second color third data; and
a variable conversion unit configured to convert the first color data, the second color third data, and the third color data into the second image data including the luminance values, the first color chrominance value, and the third color chrominance value.

24. The display apparatus of claim 23, further comprising:
a variable inverse conversion unit configured to inversely convert the adjusted luminance values, the first color chrominance value and the third color chrominance value into the inversely converted first color data, the inversely converted second color data and the inversely converted third color data; and
an inverse operation unit configured to add the first difference value to the inversely converted second color data to generate the inversely converted second color first data, and to add the second difference value to the inversely converted second color data to generate the inversely converted second color second data,
wherein the third image data includes inversely converted first color data, inversely converted second color first data, inversely converted second color second data, and inversely converted third color data.

25. A method of driving a display apparatus, the method comprising:
converting a plurality of first image data forming an image frame into a plurality of second image data each including a luminance value;
determining quantities of the second image data for the respective luminance values;
determining a distribution of the luminance values, wherein the distribution includes luminance value groups each including one or more luminance values and the plurality of luminance value groups include a first luminance value group and a second luminance value group, and the maximum luminance value of the first luminance value group is less than the minimum luminance value of the second luminance value group; and
adjusting the respective luminance values of the second image data based on the quantities of luminance values of the second image data,
wherein at least one of the converting, determining quantities, determining the distribution or the adjusting is performed at the display apparatus.

26. The method of claim 25, wherein adjusting of the respective luminance values of the second image data comprises adjusting the respective luminance values of the second image data based on the number of the second image data belonging to the first luminance value group, the second luminance value group and the third luminance value group, and wherein the respective luminance values of the second image data belonging to the first luminance value group are adjusted according to the same criteria, the respective luminance values of the second image data belonging to the second luminance value group are adjusted according to the same criteria, and the respective luminance values of the second image data belonging to the third luminance value group are adjusted according to the same criteria.

27. The method of claim 26, wherein the adjusting of the respective luminance values of the second image data comprises adjusting a variation rate of adjusted luminance value with respect to the luminance values of each of the luminance value groups to be greater than 1 if the number of the second image data belonging to the first luminance value group exceeds a threshold value, and adjusting the variation rate to be less than 1 if the number of the second image data belonging to the first luminance value group is less than the threshold value, and wherein the critical value is ⅓ a total number of the second image data belonging to the first, second and third luminance value groups.

28. The method of claim 25, wherein the adjusting the respective luminance values of the second image data comprises shifting levels of the respective luminance values according to a ratio, and the shifting of the levels of the respective luminance values comprises receiving a consumption current limit ratio and shifting levels of the luminance values according to the consumption current limit ratio.

29. The method of claim 25, wherein the first image data includes first color data, second color first data, second color second data and third color data, and wherein the converting the first image data comprises:
  converting an average of the second color first data and the second color second data into second color third data;
  performing determining a first difference between the second color first data and the second color third data, and a second difference value between the second color second data and the second color third data; and
  converting the first color data, the second color third data, and the third color data into the second image data including the luminance values, the first color chrominance value, and the third color chrominance value.

30. The method of claim 29, further comprising converting the second image data including the adjusted luminance values into third image data including inversely converted first color data, inversely converted second color first data, inversely converted second color second data, and inversely converted third color data, wherein converting of the second image data comprises:
  inversely converting the adjusted luminance values, the first color chrominance value, and the third color chrominance value into the inversely converted first color data, the inversely converted second color data, and the inversely converted third color data;
  adding the first difference value to the inversely converted second color data to generate the inversely converted second color first data; and
  adding the second difference value to the inversely converted second color data to generate the inversely converted second color second data.

31. A display apparatus comprising:
  a first image conversion unit configured to convert first image data forming an image frame into second image data including a plurality of luminance values;
  a luminance analysis unit configured to determine quantities of luminance values of the second image data, and configured to determine a distribution of the luminance values, wherein the distribution includes luminance value groups each including one or more luminance values, and the luminance value groups include a first luminance value group and a second luminance value group, wherein the maximum luminance value of the first luminance value group is less than the minimum luminance value of the second luminance value group;
  a luminance adjustment unit configured to adjust the respective luminance values of the second image data based on the distribution of luminance values of the second image data;
  a second image conversion unit configure to convert the second image data including the adjusted luminance values into third image data; and
  a display unit configured to display the image frame using the third image data.

32. A display apparatus comprising:
  a first image conversion unit configured to convert first image data forming an image frame into second image data including a plurality of luminance values;
  a luminance analysis unit configured to determine quantities of luminance values of the second image data, and configured to determine a distribution of the luminance values, wherein the distribution includes luminance value groups each including one or more luminance values; and
  a luminance adjustment unit configured to adjust the respective luminance values of the second image data based on the distribution of luminance values of the second image data,
  wherein the first image data includes first color data, second color first data, second color second data, and third color data, and the first image conversion unit comprises: a first operation unit configured to convert an average of the second color first data and the second color second data into second color third data; a second operation unit configured to perform operations of a first difference value between the second color first data and the second color third data, and a second difference value between the second color second data and the second color third data; and a variable conversion unit configured to convert the first color data, the second color third data, and the third color data into the second image data including the luminance values, the first color chrominance value, and the third color chrominance value.

33. A method of driving a display apparatus, the method comprising:
  converting a plurality of first image data forming an image frame into a plurality of second image data each including a luminance value;
  determining quantities of the second image data for the respective luminance values;
  determining a distribution of the luminance values, wherein the distribution includes luminance value groups each including one or more luminance values; and
  adjusting the respective luminance values of the second image data based on the quantities of luminance values of the second image data,
  wherein the first image data includes first color data, second color first data, second color second data and third color data, and wherein the converting the first image data comprises: converting an average of the second color first data and the second color second data into second color third data; performing determining a first difference between the second color first data and the second color third data, and a second difference value between the second color second data and the second color third data; and converting the first color data, the second color third data, and the third color data into the second image data including the luminance values, the first color chrominance value, and the third color chrominance value,
  wherein at least one of the converting, determining quantities, determining the distribution or the adjusting is performed at the display apparatus.

* * * * *